United States Patent [19]

Lindemann

[11] 3,933,691
[45] Jan. 20, 1976

[54] CRUSHED FOAM-BACKED FABRICS AND EMULSIONS FOR PRODUCING THE SAME

[75] Inventor: Martin K. Lindemann, Greenville, S.C.

[73] Assignee: Chas. S. Tanner Co., Greenville, S.C.

[22] Filed: Jan. 16, 1974

[21] Appl. No.: 433,634

[52] U.S. Cl. .................. 260/2.5 L; 260/29.4 UA; 260/29.6 TA; 428/304
[51] Int. Cl.² ............................................ C08J 9/12
[58] Field of Search .......... 161/159, 160; 260/2.5 L, 260/29.6 TA, 29.4 UA; 428/304

[56] References Cited
UNITED STATES PATENTS

| | | | |
|---|---|---|---|
| 3,547,845 | 12/1970 | Pinkney | 260/29.6 TA |
| 3,553,116 | 1/1971 | Kaplan et al. | 260/29.6 TA |
| 3,607,341 | 9/1971 | Goins et al. | 161/159 |
| 3,642,680 | 2/1972 | Jennings et al. | 260/29.6 TA |
| 3,692,723 | 9/1972 | Kasagi et al. | 260/29.6 TA |
| 3,714,105 | 1/1973 | Stehle et al. | 260/29.6 TA |
| 3,732,184 | 5/1973 | Lindemann et al. | 260/77.5 BB |
| 3,844,990 | 10/1974 | Lindemann et al. | 260/29.6 R |

*Primary Examiner*—Eugene C. Rzucidlo
*Attorney, Agent, or Firm*—Dressler, Goldsmith, Clement & Gordon, Ltd.

[57] ABSTRACT

Crushed foam-backed fabrics possessing improved dry cleaning resistance and cold crack resistance are provided using aqueous emulsion copolymers of ethylene and vinyl acetate containing from 3–9% of cross-linking monomers and having a molecular weight of at least about 300,000.

14 Claims, No Drawings

CRUSHED FOAM-BACKED FABRICS AND EMULSIONS FOR PRODUCING THE SAME

The present invention relates to aqueous emulsions useful in the production of crushed foam-backed fabrics possessing improved dry clean resistance, and cold crack resistance.

Crushed foam-backed fabrics have taken on increasing importance, particularly as a backing for drapery. Unfortunately, it has been difficult to provide a proper balance of diverse properties, since resistance to dry cleaning must be combined with good resilience which must be maintained at low temperature. Of course, external plasticizers can be used to help maintain low temperature resiliency, but these are fugitive and solvent soluble and, hence, cannot be used.

The materials presently in use are all acrylic copolymers, or combinations of vinyl acetate with acrylic esters such as butyl acrylate. Polyvinyl acetate itself is much too brittle. Using 30% of butyl acrylate in an effort to add resiliency to the vinyl acetate was not satisfactory. Dry clean resistance, hot tack resistance, and cold crack resistance were all poor. The addition of cross-linking monomers to such a system would improve the hot tack resistance, but it would lower the cold crack resistance, and hence this is no answer to the problem.

Initial efforts to use a copolymer of vinyl acetate and ethylene were unsuccessful. In the absence of cross-linking monomer, the copolymer lacks dry clean resistance. When cross-linking monomers were used, the cold crack resistance remained inadequate. While one could add a larger proportion of cross-linking monomers to enhance dry clean resistance, this would be self-defeating since it would further impair the already inadequate cold crack resistance.

The use of vinyl chloride was not helpful. Adding it to the cross-linked vinyl acetate-ethylene system in an amount of 20% did not help the cold crack resistance.

Curiously, when a vinyl acetate-ethylene copolymer of appropriate ethylene content is formed to possess sufficient molecular weight, and when there is incorporated in this copolymer a regulated proportion of cross-linking monomer, then outstanding dry clean resistance is combined with a resilient crushed foam which passes both hot tack and cold crack testing.

More particularly, in this invention, the copolymers which are used are constituted by monoethylenic monomers consisting essentially of from 15–40% ethylene, from 3–9% of cross-linking monomers, balance vinyl acetate. These monomers are copolymerized in aqueous emulsion under conditions providing a molecular weight of at least about 300,000, preferably at least 350,000. This is significantly higher than conventional ethylenevinyl acetate copolymers which have a maximum molecular weight of about 250,000.

It will be understood that the cross-linking monomers do not react significantly during copolymerization, so the copolymer particles formed in the emulsion are non-gelled and coalesce easily on air drying. If some cross-linking does occur, then molecular weight can be determined by light scattering or other method, but so long as the copolymer is essentially linear, the molecular weight can be determined from the intrinsic viscosity (measured in dimethyl formamide at 30°C. and extrapolated to 0 concentration). The conversion of intrinsic viscosity to molecular weight can be carried out using the acetone line in the vinyl acetate graph in the Encyclopedia of Polymer Science and Technology, Vol. 15, page 631 (Interscience 1972).

While the molecular weight critically needed herein is higher than usual, it is not particularly difficult to obtain and various mechanisms are available to obtain it. Thus, if a larger proportion of unreacted monomer is maintained in the reaction kettle during most of the polymerization, the molecular weight will be increased. This is simply achieved by adding the monomers more rapidly, or by adding the usual redox catalysts less rapidly. Lowering reaction temperature will also serve to increase molecular weight, as will increasing the duration of the reaction.

The ethylene content of the copolymer may range from 15–40%, but is preferably in the range of 20–40%, most preferably 25–35%.

The cross-linking monomers are preferably monoethylenically unsaturated monomers carrying the N-methylol group, these being illustrated by N-methylol acrylamide or an N-methylol derivative of allyl carbamate which may contain one or two N-methylol groups. Many other members of this known class of monomers will be evident to those skilled in the art.

The N-methylol groups may be left unreacted, or they may be etherified, as with a $C_1$–$C_8$ alcohol, preferably a $C_1$–$C_4$ alcohol. The alcohol is released on baking to regenerate the N-methylol group for cure, as is well known.

Alcohol etherifying agents are illustrated by methyl alcohol and ethyl alcohol. Isopropyl alcohol, isobutyl alcohol, 2-ethoxy ethanol, and 2-butoxy ethanol are also useful.

While vinyl acetate is relied upon herein to constitute the balance of the copolymer, all of the vinyl esters with saturated aliphatic monocarboxylic acids are useful in small proportion in this invention to replace a portion of the vinyl acetate. Vinyl stearate and vinyl versatate will illustrate the vinyl esters under consideration, and replacement in an amount of up to 20% by weight is included.

The cross-linking monomers can be constituted entirely by those having the N-methylol group, but it is preferred to include a proportion of monomers carrying active hydrogen which is reactive with the N-methylol group.

Particularly desirable monomers for inclusion in the copolymer as part of the cross-linking monomer component are acrylamide, methacrylamide, or other monoethylenic unsaturated amide as well as monoethylenic alcohols such as allyl alcohol, 2-hydroxy ethyl acrylate- or methacrylate, or the like.

The presence of a small proportion of an amide or alcohol as noted above is particularly desirable since it significantly improves the cure with the N-methylol functionality.

Another monomer which may optionally be present in small amount and which is helpful to enhance the cure is a small proportion of monoethylenic acid such as maleic, acrylic, or methacrylic acids or, more preferably, crotonic acid, 0.5–3% being typical. Monoethylenic sulphonic acids, or their salts, such as 2-sulphoethyl methacrylate or sodium vinyl sulphonate are also useful.

It is particularly desired to rely upon an N-methoxy derivative of an allyl carbamate since these provide the best physical properties on subsequent cure. These are provided by adducting formaldehyde with an allyl carbamate which has the formula:

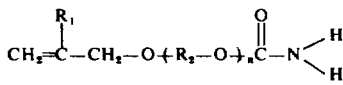

in which $R_1$ is hydrogen or methyl, $R_2$ is an alkylidene group containing from 2-4 carbon atoms, and $n$ is an integer from 0-10, preferably from 0-2.

Various allyl carbamates are useful herein, especially allyl carbamate and methallyl carbamate.

Allyl carbamate has the formula:

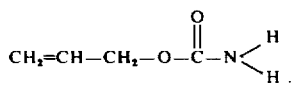

This monoethylenic monomer is not an amide, and it will react with formaldehyde in an addition reaction with the two amino hydrogen atoms to generate the N-methylol group. When one molar proportion of formaldehyde is taken up, the derivative can be described by the formula:

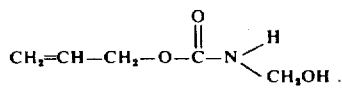

The same reaction can proceed to take up more formaldehyde to increase the N-methylol functionality which is generated.

Emulsion copolymers based on allyl carbamates are more fully described in my copending application Ser. No. 340,536, filed Mar. 12, 1973.

While it is preferred to rely upon the N-methylol group for cure, the epoxy group may be used instead, e.g., allyl glycidyl ether or glycidyl acrylate or methacrylate. These are desirably used together with monomers providing hydroxy or carboxy functionality as noted hereinbefore. It is the degree and uniformity of cross-linking after curing which is of prime importance.

A small amount, up to about 0.5% of a polyethylenic compound such as butylene glycol diacrylate or divinyl benzene may be included to increase molecular weight during copolymerization. Excessive cross-linking prior to cure is detrimental and must be avoided.

Since the aqueous emulsion polymerization of vinyl acetate with ethylene is well known per se, it will not be described at length. However, it is stressed again that the N-methylol allyl carbamate is easier to use since it will enter the copolymer at about the same rate as the vinyl acetate and ethylene so that the distribution of the N-methylol group in the final copolymer is considerably improved, and the greater solubility of the functional monomer in vinyl acetate also improves the ultimate product properties, especially hot tack resistance which is a function of uniform cure on baking. From 0.5-7% of the N-methylol allyl carbamate or its ether is preferred in the final emulsion copolymer. Auxiliary agents may also be present, as is known, such as protective colloids illustrated by polyvinyl alcohol and hydroxy ethyl cellulose. Ammonia or amine may be added to enhance emulsion stability.

From the standpoint of cure, baking is normally carried out at temperatures of from 250°-500°F. for periods of from 30 seconds to 1 hour, but more usually at 275°-350°F. for from 2-20 minutes.

The emulsions produced by emulsion copolymerization are then formulated to improve the capacity to maintain a foam structure at the curing temperature. For this purpose, surfactants such as ammonium stearate, oleate, or palmitate, are incorporated. Thickeners such as hydroxy ethyl cellulose or polyvinyl alcohol are added to obtain a viscosity in the range of 500-5000 centipoises at which viscosity air is whipped into the emulsion to provide a foam. On a volumetric basis, the original emulsion is whipped until it possesses about 5 to about 10 times its original volume.

Other agents known for incorporation in foam compositions may be included as is known to the art, such as foam stabilizers, illustrated by $C_{12}$-$C_{20}$ fatty acid amides, and auxiliary cross-linking agents, such as aminoplast resins illustrated by water dispersible or soluble melamine-formaldehyde condensates. These aminoplast resins may be used in an amount of from 1-15% of the weight of the copolymer solids, or omitted entirely.

The foams used herein are pigmented, a pigment to binder weight ratio of from 0.1:1 to 2:1 being broadly useful, but a ratio of about 1:1 being customary. All of the pigments and mineral fillers useful in paint technology are useful herein.

The foams are applied by knife coating, followed by drying, crushing, and baking to cure the same. Typically, the wet thickness is about 60 mils, the coatings are dried to a moisture content in the range of about 5-20%, the thickness after crushing is about 10 mils, and baking is carried out as noted hereinbefore, a preferred schedule being 1-5 minutes at 300°-350°F.

The proportions referred to herein and throughout this specification are by weight unless otherwise specified.

The invention is illustrated in the examples which follow:

EXAMPLE 1

Latex compositions were prepared by thoroughly blending 300 parts of emulsion copolymerized acrylic latex (about 50% solids) with 150 parts of titanium dioxide pigment, and 15 parts of water dispersible melamine formaldehyde resin. 7.2 Parts of water soluble ammonium stearate soap are used to stabilize the latex composition which is then mechanically foamed into a stable froth having a density of 135 gms/liter by whipping air into the composition. The resultant froth consisting of fine bubbles was then knife coated on the back side of a rayon/acetate satin drapery fabric using a knife positioned to provide a 60 mil opening above the fabric. The wet coated fabric was then partially dried at 180°F. to about 12% moisture content in the coating and the partially dried fabric is crushed by passing the fabric through nip rolls which apply two tons of pressure over a nip area of 135 in.². The crushed coating is then cured at 330°F. for 3 minutes. A soft foam coated drapery fabric having a white backing is obtained resembling commercial foam backed drapery fabric. The fabric had 98 counts in warp (acetate) and 58 counts in filling (rayon).

Various copolymers were used in the above example, and the final foam backed fabrics were tested to determine their capacity to withstand the various tests to which such fabrics are normally subjected. The following results were obtained.

TABLE 1

| Sample | 5 Washes | Dry-5 cleanings | Hot Tack | Cold Crack Fab. to Fab. | Cold Crack Foam to Foam |
| --- | --- | --- | --- | --- | --- |
| Example A | 3 | 1 | Failed | Failed | Passed |
| Example B | 3 | 5 | Passed | Passed | Passed |
| Example C | 2 | 1 | Passed | Failed | Passed |
| Example D | 3 | 1 | Passed | Failed | Passed |
| Example E | 1 | 1 | Failed | Failed | Passed |
| Example F | 2 | 1 | Failed | Failed | Failed |

The ratings used in the above Table are identified as follows:

| Rating | Description |
| --- | --- |
| 5 | No foam loss even at corner of double crease |
| 4 | Foam loss only at corner of double crease |
| 3 | Minor foam loss only along creased portion |
| 2 | Major foam loss only along creased portion |
| 1 | Foam loss on creased and uncreased portions |

The polymers tested are identified in the following tabulation.

TABLE 2

| Polymer | Vinyl Acetate | Ethylene | Butyl Acrylate | Equiweight Mixture Acrylamide and N-methylol Acrylamide | Vinyl Chloride |
| --- | --- | --- | --- | --- | --- |
| A*** | 70 | | 30 | | |
| B* | 65 | 30 | | 5 | |
| C** | 63 | 32 | | 5 | |
| D | 55 | 20 | | 5 | 20 |
| E | | 40 | | | 60 |
| F | 100 | | | | |

*molecular weight = 400,000
**molecular weight = 250,000
***0.5% glycol diacrylate added to improve hot tack, molecular weight = 450,000

As will now be evident, the higher molecular weight copolymer of ethylene and vinyl acetate containing about 5% of cross-linking monomers was the only one to pass all the tests. Its dry clean resistance was outstanding, and it was the only one passing the difficult fabric to fabric cold crack test.

The various tests used are as follows.

Durability to Five Washes

Samples of foam coated fabric are cut about 2 inches in warp direction and about 7 inches in filling direction. The samples are folded fabric facing fabric to new dimension of about 1 × 7 inches and then folded again to the final dimension of about 1 × 3½ inches to form a cuff. At this dimension the samples were stapled to retain that shape. The prepared samples were then washed five times along with five pounds of a dummy load in a Kenmore washing machine using a normal wash cycle, 120°F. wash, 120°F. rinse, and one cup of "Tide" detergent. After washing, the samples were tumble dried. After drying the samples were unfolded and visually examined for loss of foam from the fabric and rated as indicated previously.

Durability to Five Drycleanings

The samples for this test were prepared in the form of cuffs as described hereinbefore. The samples were submitted to "One Hour Martinizing" for five commercial drycleanings. The drycleaned samples were unfolded and rated the same way as the laundered samples.

Hot Tack

Samples of approximately 2 × 7 inches were cut for this test and folded once with foam facing the foam to form a new dimension of about 2 × 3½ inches. A dry hot iron supplied by General Electric (Cat. No. 71F54, 1100 watts) preheated at the setting of Linen was placed on the folded sample for 30 seconds and then removed. The sample was allowed to cool to room temperature and unfolded. The sample was then observed for delamination of foam from the surface of the fabric. With no visual delamination of foam, samples were rated "passed" whereas with any visual delamination of foam, the samples were rated "failed".

Cold Crack

Samples were evaluated for cold crack by taking an 8 × 4 inches sample (8 inches in warp direction) and folding it into the form of a Z. The folded sample was placed on a glass plate in a 0°F. freezer for 2 hours, and was then removed and immediately rolled using a 13 pound roller, 12 inches in length. After three back and forth rolls, the fabric was opened, and the crease areas were inspected. If any cracks could be seen by the eye, then the test is rated "failed".

The invention is defined in the claims which follow.

I claim:

1. A pigmented foam comprising an aqueous emulsion comprising an aqueous medium having colloidally suspended therein an emulsion copolymer consisting essentially of from 15–40% ethylene, from 3–9% of cross-linking monomers, balance vinyl acetate, said copolymer having a molecular weight of at least about 300,000, said emulsion containing dispersed pigment in a pigment to binder weight ratio of from 0.1:1 to 2:1 and surfactant to stabilize the same, said emulsion having whipped therein air in an amount increasing the volume of said emulsion from about 5 to about 10-fold its original volume.

2. A pigmented foam as recited in claim 1 in which said cross-linking monomers include monoethylenically unsaturated monomer carrying the N-methylol group.

3. A pigmented foam as recited in claim 2 in which the said N-methylol group is etherified with a $C_1$–$C_8$ alcohol.

4. A pigmented foam as recited in claim 2 in which the said N-methylol group is etherified with A $C_1$–$C_4$ alcohol.

5. A pigmented foam as recited in claim 2 in which said cross-linking monomers include a proportion of monomer carrying active hydrogen reactive with the N-methylol group.

6. A pigmented foam as recited in claim 5 in which said monomer carrying active hydrogen is selected from the group consisting of monoethylenic amides and monoethylenic alcohols.

7. A pigmented foam as recited in claim 2 in which said cross-linking monomers further include from 0.5–3% of a monoethylenic acid.

8. A pigmented foam as recited in claim 2 in which said monomer carrying the N-methylol group is an adduct of formaldehyde with an allyl carbamate having the formula:

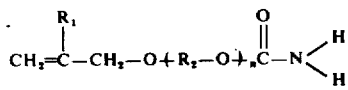

in which $R_1$ is hydrogen or methyl, $R_2$ is an alkylidene group containing from 2-4 carbon atoms, and $n$ is an integer from 0–10.

9. A pigmented foam as recited in claim 8 in which said adduct has the formula:

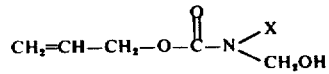

in which X is selected from hydrogen and methylol.

10. A pigmented foam as recited in claim 9 in which said formaldehyde adduct is etherified with a $C_1$–$C_4$ alcohol.

11. A pigmented foam as recited in claim 1 in which the cross-linking monomer component carries the epoxy group.

12. A pigmented foam as recited in claim 1 in which said copolymer has a molecular weight of at least 350,000.

13. A pigmented foam as recited in claim 1 in which said emulsion includes dissolved thickener providing a viscosity of from 500–5,000 centipoises.

14. A fabric having a surface thereof coated with the pigmented foam of claim 1, said foam being in a cured compacted condition.

* * * * *